US008913071B2

(12) United States Patent
Jung et al.

(10) Patent No.: US 8,913,071 B2
(45) Date of Patent: Dec. 16, 2014

(54) LIQUID CRYSTAL DISPLAY, AND DEVICE AND METHOD OF MODIFYING IMAGE SIGNAL FOR LIQUID CRYSTAL DISPLAY

(75) Inventors: Sung Gon Jung, Suwon-si (KR); Sang Su Han, Yongin-si (KR); Seok Hwan Roh, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 580 days.

(21) Appl. No.: 13/215,395

(22) Filed: Aug. 23, 2011

(65) Prior Publication Data

US 2012/0256904 A1 Oct. 11, 2012

(30) Foreign Application Priority Data

Apr. 8, 2011 (KR) ........................ 10-2011-0032588

(51) Int. Cl.
*G09G 5/36* (2006.01)
*G06T 9/00* (2006.01)
*G09G 3/36* (2006.01)

(52) U.S. Cl.
CPC ........................................ *G09G 3/36* (2013.01)
USPC ........................................... 345/545; 345/555

(58) Field of Classification Search
CPC .............. G09G 5/393; G09G 2340/16; G09G 2320/0285; G09G 3/3685
USPC .................................................. 345/545, 555
See application file for complete search history.

(56) References Cited

U.S. PATENT DOCUMENTS

| | | | |
|---|---|---|---|
| 5,784,064 A | 7/1998 | Penna et al. | |
| 6,009,201 A | 12/1999 | Acharya | |
| 6,571,015 B1 | 5/2003 | Matsuo et al. | |
| 7,190,836 B2 | 3/2007 | Krishnan et al. | |
| 8,311,095 B2 * | 11/2012 | Brown et al. | 375/240.02 |
| 8,493,435 B2 * | 7/2013 | Kim et al. | 348/43 |
| 2009/0309903 A1 * | 12/2009 | Park et al. | 345/690 |

FOREIGN PATENT DOCUMENTS

| | | |
|---|---|---|
| JP | 3347684 | 9/2002 |
| JP | 4534932 | 6/2010 |
| JP | 4549944 | 7/2010 |
| KR | 1020010058369 | 7/2001 |
| KR | 1020070079233 | 8/2007 |
| KR | 1020080001135 | 1/2008 |
| KR | 1020080022689 | 3/2008 |
| KR | 1020080047081 | 5/2008 |

* cited by examiner

*Primary Examiner* — Hau Nguyen
(74) *Attorney, Agent, or Firm* — Cantor Colburn LLP

(57) ABSTRACT

An image signal modifying device includes a pixel, a memory which stores compressed information in which a three-dimensional ("3-D") lookup table is coded, an image signal modifying unit which decodes the compressed information to generate a restored 3-D lookup table and generates a modified signal based on a first image signal of a first frame, a second image signal of a second frame, a third image signal of a third frame and the restored 3-D lookup table, and a data driver which converts the modified signal into the data voltage and supplies the data voltage to the pixel.

20 Claims, 11 Drawing Sheets

FIG. 3

LUT 224

| 192 | | 0 | 16 | 32 | 48 | 64 | 80 | 96 | 112 | 128 | 144 | 160 | 176 | 192 | 208 | 224 | 240 | 255 |
|---|---|---|---|---|---|---|---|---|---|---|---|---|---|---|---|---|---|---|
| | 0 | 0 | 0 | 0 | 0 | 0 | 0 | 0 | 0 | 0 | 0 | 0 | 0 | 0 | 0 | 0 | 0 | 0 |
| | | | | | | | | | 1 | 1 | 1 | 1 | 1 | 1 | 1 | 1 | 1 | 1 |
| | | | | | | | | | 2 | 2 | 1 | 1 | 1 | 1 | 1 | 1 | 1 | 1 |
| | | | | | | | | | 7 | 6 | 4 | 2 | 2 | 2 | 2 | 2 | 2 | 1 |
| | | | | | | | | | 30 | 22 | 16 | 10 | 8 | 6 | 5 | 5 | 4 | 2 |
| | | | | | | | | | 59 | 45 | 34 | 29 | 25 | 18 | 16 | 13 | 11 | 8 |
| | | | | | | | | | 84 | 74 | 64 | 60 | 53 | 45 | 38 | 30 | 24 | 17 |
| | | | | | | | | | 109 | 97 | 88 | 84 | 76 | 68 | 63 | 58 | 50 | 43 |
| | | | | | | | | | 129 | 125 | 116 | 109 | 101 | 93 | 90 | 85 | 82 | 80 |
| | | | | | | | | | 150 | 145 | 141 | 132 | 127 | 120 | 119 | 114 | 110 | 109 |
| | | | | | | | | | 167 | 165 | 159 | 159 | 150 | 147 | 145 | 142 | 137 | 135 |
| | | | | | | | | | 185 | 183 | 179 | 176 | 175 | 170 | 166 | 162 | 159 | 159 |
| | | | | | | | | | 197 | 196 | 195 | 194 | 193 | 192 | 189 | 186 | 183 | 183 |
| | | | | | | | | | 212 | 212 | 212 | 212 | 211 | 210 | 208 | 205 | 204 | 203 |
| | | | | | | | | | 230 | 230 | 230 | 230 | 228 | 228 | 225 | 224 | 222 | 222 |
| | | | | | | | | | 245 | 245 | 245 | 244 | 244 | 242 | 240 | 240 | 240 | 240 |
| | | | | | | | | | 255 | 255 | 255 | 255 | 255 | 255 | 255 | 255 | 255 | 255 |

LUT 208

| 192 | | 0 | 16 | 32 | 48 | 64 | 80 | 96 | 112 | 128 | 144 | 160 | 176 | 192 | 208 | 224 | 240 | 255 |
|---|---|---|---|---|---|---|---|---|---|---|---|---|---|---|---|---|---|---|
| | 0 | 0 | 0 | 0 | 0 | 0 | 0 | 0 | 0 | 0 | 0 | 0 | 0 | 0 | 0 | 0 | 0 | 0 |
| | | | | | | | | | 1 | 1 | 1 | 1 | 1 | 1 | 1 | 1 | 1 | 1 |
| | | | | | | | | | 2 | 2 | 1 | 1 | 1 | 1 | 1 | 1 | 1 | 1 |
| | | | | | | | | | 7 | 6 | 4 | 2 | 2 | 2 | 2 | 2 | 2 | 1 |
| | | | | | | | | | 30 | 22 | 16 | 10 | 8 | 6 | 5 | 5 | 4 | 2 |
| | | | | | | | | | 59 | 45 | 34 | 29 | 25 | 18 | 16 | 13 | 11 | 8 |
| | | | | | | | | | 84 | 74 | 64 | 60 | 53 | 45 | 38 | 30 | 24 | 17 |
| | | | | | | | | | 109 | 97 | 88 | 84 | 76 | 68 | 63 | 58 | 50 | 43 |
| | | | | | | | | | 129 | 125 | 116 | 109 | 101 | 93 | 90 | 85 | 82 | 80 |
| | | | | | | | | | 150 | 145 | 141 | 132 | 127 | 120 | 119 | 114 | 110 | 109 |
| | | | | | | | | | 167 | 165 | 159 | 159 | 150 | 147 | 145 | 142 | 137 | 135 |
| | | | | | | | | | 185 | 183 | 179 | 176 | 175 | 170 | 166 | 162 | 159 | 159 |
| | | | | | | | | | 197 | 196 | 195 | 194 | 193 | 192 | 189 | 186 | 183 | 183 |
| | | | | | | | | | 212 | 212 | 212 | 212 | 211 | 210 | 208 | 205 | 204 | 203 |
| | | | | | | | | | 230 | 230 | 230 | 230 | 228 | 228 | 225 | 224 | 222 | 222 |
| | | | | | | | | | 245 | 245 | 245 | 244 | 244 | 242 | 240 | 240 | 240 | 240 |
| | | | | | | | | | 255 | 255 | 255 | 255 | 255 | 255 | 255 | 255 | 255 | 255 |

LUT 192

| 192 | | 0 | 16 | 32 | 48 | 64 | 80 | 96 | 112 | 128 | 144 | 160 | 176 | 192 | 208 | 224 | 240 | 255 |
|---|---|---|---|---|---|---|---|---|---|---|---|---|---|---|---|---|---|---|
| | 0 | 0 | 0 | 0 | 0 | 0 | 0 | 0 | 0 | 0 | 0 | 0 | 0 | 0 | 0 | 0 | 0 | 0 |
| | 16 | 22 | 5 | 4 | 2 | 1 | 1 | 1 | 1 | 1 | 1 | 1 | 1 | 1 | 1 | 1 | 1 | 1 |
| | 32 | 32 | 30 | 23 | 14 | 6 | 3 | 3 | 2 | 2 | 1 | 1 | 1 | 1 | 1 | 1 | 1 | 1 |
| | 48 | 40 | 40 | 40 | 37 | 25 | 17 | 11 | 7 | 6 | 4 | 2 | 2 | 2 | 2 | 2 | 2 | 1 |
| | 64 | 64 | 64 | 64 | 61 | 57 | 50 | 42 | 30 | 22 | 16 | 10 | 8 | 6 | 5 | 5 | 4 | 2 |
| | 80 | 78 | 78 | 78 | 77 | 76 | 76 | 65 | 59 | 45 | 34 | 29 | 25 | 18 | 16 | 13 | 11 | 8 |
| | 96 | 97 | 97 | 97 | 96 | 94 | 94 | 92 | 84 | 74 | 64 | 60 | 53 | 45 | 38 | 30 | 24 | 17 |
| | 112 | 118 | 118 | 118 | 118 | 117 | 117 | 117 | 109 | 97 | 88 | 84 | 76 | 68 | 63 | 58 | 50 | 43 |
| | 128 | 135 | 135 | 135 | 135 | 134 | 134 | 134 | 129 | 125 | 116 | 109 | 101 | 93 | 90 | 85 | 82 | 80 |
| | 144 | 152 | 152 | 152 | 152 | 151 | 151 | 151 | 150 | 145 | 141 | 132 | 127 | 120 | 119 | 114 | 110 | 109 |
| | 160 | 170 | 170 | 170 | 170 | 170 | 169 | 168 | 167 | 165 | 159 | 159 | 150 | 147 | 145 | 142 | 137 | 135 |
| | 176 | 186 | 186 | 186 | 186 | 186 | 186 | 186 | 185 | 183 | 179 | 176 | 175 | 170 | 166 | 162 | 159 | 159 |
| | 192 | 204 | 203 | 202 | 201 | 200 | 199 | 198 | 197 | 196 | 195 | 194 | 193 | 192 | 189 | 186 | 183 | 183 |
| | 208 | 212 | 212 | 212 | 212 | 212 | 212 | 212 | 212 | 212 | 212 | 212 | 211 | 210 | 208 | 205 | 204 | 203 |
| | 224 | 230 | 230 | 230 | 230 | 230 | 230 | 230 | 230 | 230 | 230 | 230 | 228 | 228 | 225 | 224 | 222 | 222 |
| | 240 | 247 | 247 | 246 | 246 | 246 | 246 | 245 | 245 | 245 | 245 | 244 | 244 | 242 | 240 | 240 | 240 | 240 |
| | 255 | 255 | 255 | 255 | 255 | 255 | 255 | 255 | 255 | 255 | 255 | 255 | 255 | 255 | 255 | 255 | 255 | 255 |

LUT 192 - LUT 208

LUT 208 - LUT 224 rG(n)

rG(n-1)

FIG. 4

| 192-208 | | 0 | 16 | 32 | 48 | 64 | 80 | 96 | 112 | 128 | 144 | 160 | 176 | 192 | 208 | 224 | 240 | 255 |
|---|---|---|---|---|---|---|---|---|---|---|---|---|---|---|---|---|---|---|
| | 0 | 0 | 0 | 0 | 0 | 0 | 0 | 0 | 0 | 0 | 0 | 0 | 0 | 0 | 0 | 0 | 0 | 0 |
| | 16 | 2 | 0 | 1 | 0 | 0 | 0 | 0 | 0 | 0 | 0 | 0 | 0 | 0 | 0 | 0 | 0 | 0 |
| | 32 | 0 | 1 | 3 | 0 | 1 | 0 | 0 | 0 | 0 | 0 | 0 | 0 | 0 | 0 | 0 | 0 | 0 |
| | 48 | 1 | 1 | 1 | 1 | 1 | 1 | 0 | 0 | 1 | 1 | 0 | 0 | 0 | 0 | 0 | 0 | 0 |
| | 64 | 3 | 3 | 3 | 2 | 1 | 1 | 1 | 0 | 1 | 0 | 0 | 0 | 0 | 0 | 1 | 1 | 0 |
| | 80 | 1 | 1 | 1 | 0 | 0 | 1 | 1 | 1 | 1 | 0 | 0 | 2 | 0 | 1 | 2 | 1 | 0 |
| | 96 | 1 | 1 | 1 | 0 | 0 | 0 | 0 | 2 | 2 | 0 | 0 | 0 | 1 | 5 | 2 | 0 | 0 |
| | 112 | 1 | 1 | 1 | 1 | 0 | 0 | 0 | 1 | 0 | 0 | 1 | 0 | 2 | 1 | 2 | 1 | 1 |
| | 128 | 1 | 1 | 1 | 1 | 1 | 1 | 0 | 0 | 1 | 0 | 1 | 1 | 2 | 5 | 3 | 2 | 3 |
| | 144 | 2 | 2 | 2 | 2 | 2 | 2 | 2 | 1 | 0 | 0 | 1 | 1 | 1 | 5 | 3 | 3 | 3 |
| | 160 | 3 | 3 | 3 | 3 | 3 | 3 | 2 | 2 | 1 | 0 | 2 | 0 | 1 | 5 | 4 | 2 | 2 |
| | 176 | 2 | 2 | 2 | 2 | 2 | 2 | 2 | 2 | 1 | 0 | 0 | 1 | 1 | 2 | 1 | 0 | 1 |
| | 192 | 3 | 3 | 2 | 2 | 1 | 1 | 0 | 0 | 0 | 0 | 0 | 0 | 1 | 1 | 1 | 0 | 1 |
| | 208 | 1 | 1 | 1 | 1 | 1 | 1 | 1 | 1 | 1 | 1 | 1 | 0 | 0 | 0 | 0 | 1 | 0 |
| | 224 | 0 | 0 | 0 | 0 | 0 | 0 | 0 | 0 | 0 | 0 | 0 | 0 | 1 | 0 | 0 | 0 | 1 |
| | 240 | 0 | 0 | 0 | 0 | 0 | 0 | 0 | 0 | 0 | 0 | 0 | 0 | 0 | 0 | 0 | 0 | 0 |
| | 255 | 0 | 0 | 0 | 0 | 0 | 0 | 0 | 0 | 0 | 0 | 0 | 0 | 0 | 0 | 0 | 0 | 0 |

dT14

FIG. 5

| 208-224 | 0 | 16 | 32 | 48 | 64 | 80 | 96 | 112 | 128 | 144 | 160 | 176 | 192 | 208 | 224 | 240 | 255 |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 16 | 2 | 0 | 0 | 0 | 0 | 0 | 0 | 0 | 0 | 0 | 0 | 0 | 0 | 0 | 0 | 0 | 0 |
| 32 | 0 | 1 | 3 | 0 | 1 | 0 | 0 | 0 | 0 | 0 | 0 | 0 | 0 | 0 | 0 | 0 | 0 |
| 48 | 1 | 1 | 2 | 1 | 0 | 0 | 0 | 0 | 0 | 0 | 0 | 0 | 0 | 0 | 0 | 0 | 0 |
| 64 | 4 | 4 | 4 | 2 | 0 | 0 | 0 | 0 | 1 | 0 | 0 | 0 | 0 | 0 | 1 | 0 | 0 |
| 80 | 1 | 1 | 1 | 1 | 0 | 0 | 0 | 0 | 0 | 0 | 0 | 1 | 0 | 1 | 1 | 0 | 0 |
| 96 | 1 | 1 | 1 | 1 | 0 | 0 | 0 | 1 | 1 | 0 | 0 | 0 | 1 | 1 | 2 | 0 | 0 |
| 112 | 1 | 1 | 1 | 1 | 1 | 1 | 1 | 0 | 0 | 0 | 0 | 0 | 2 | 3 | 2 | 1 | 1 |
| 128 | 2 | 2 | 2 | 2 | 1 | 1 | 1 | 1 | 0 | 0 | 0 | 0 | 1 | 0 | 2 | 1 | 2 |
| 144 | 3 | 3 | 3 | 3 | 2 | 2 | 2 | 2 | 1 | 1 | 0 | 1 | 1 | 1 | 3 | 2 | 2 |
| 160 | 4 | 4 | 4 | 4 | 4 | 3 | 3 | 2 | 2 | 0 | 1 | 0 | 0 | 2 | 4 | 2 | 1 |
| 176 | 3 | 3 | 3 | 3 | 3 | 3 | 3 | 2 | 1 | 0 | 0 | 0 | 1 | 1 | 1 | 0 | 0 |
| 192 | 4 | 3 | 3 | 2 | 2 | 1 | 1 | 0 | 0 | 0 | 0 | 0 | 1 | 1 | 1 | 0 | 0 |
| 208 | 3 | 3 | 3 | 3 | 3 | 3 | 3 | 3 | 3 | 3 | 3 | 3 | 2 | 1 | 1 | 0 | 0 |
| 224 | 1 | 1 | 1 | 1 | 1 | 1 | 1 | 1 | 1 | 1 | 1 | 0 | 1 | 0 | 0 | 0 | 0 |
| 240 | 0 | 0 | 0 | 1 | 1 | 1 | 0 | 0 | 0 | 0 | 0 | 0 | 0 | 0 | 0 | 0 | 0 |
| 255 | 0 | 0 | 0 | 0 | 0 | 0 | 0 | 0 | 0 | 0 | 0 | 0 | 0 | 0 | 0 | 0 | 0 |

dT15

LIQUID CRYSTAL DISPLAY, AND DEVICE AND METHOD OF MODIFYING IMAGE SIGNAL FOR LIQUID CRYSTAL DISPLAY

This application claims priority to Korean Patent Application No. 10-2011-0032588, filed on Apr. 8, 2011, and all the benefits accruing therefrom under 35 U.S.C. §119, the content of which in its entirety is herein incorporated by reference.

BACKGROUND OF THE INVENTION (a) Field of the Invention

The invention relates to a liquid crystal display, a device modifying an image signal for a liquid crystal display, and a method of modifying an image signal.

(b) Description of the Related Art

A liquid crystal display, which is one of the most widely used type of flat panel displays, typically includes two display panels where field generating electrodes, such as a pixel electrode and a common electrode, are provided with a liquid crystal layer interposed therebetween. The liquid crystal display generates an electric field in the liquid crystal layer by applying a voltage to the field generating electrodes to determine orientations of liquid crystal molecules of the liquid crystal layer and control polarization of incident light, thereby displaying an image.

The liquid crystal display generally includes a pixel including a switching element, such as a thin film transistor ("TFT"), which is a 3-terminal element, and a display panel provided with display signal lines, such as a gate line and a data line. The thin film transistor serves as a switching element that transfers or interrupts data voltage transferred through the data line to a pixel according to a gate signal transferred through the gate line.

A liquid crystal capacitor includes a pixel electrode and a common electrode as two terminals thereof, and the liquid crystal layer interposed between the two electrodes serves as a dielectric material. A difference between a data voltage applied to the pixel electrode and a common voltage applied to the common electrode is represented as a charge voltage of the liquid crystal capacitor, i.e., a pixel voltage. Orientations of liquid crystal molecules vary depending on the magnitude of the pixel voltage, and as a result, polarization of light passing through the liquid crystal layer varies. The polarization variation is shown as a variation of transmittance of light by a polarizer attached to the liquid crystal display, and as a result, the pixel displays luminance corresponding to a gray of an image signal.

However, due to the response speed of the liquid crystal molecules, a predetermined time is required until the pixel voltage of the liquid crystal capacitor reaches a target voltage, which is a voltage used to acquire desired luminance, and the time is changed by a difference of the voltage previously charged in the liquid crystal capacitor. Therefore, for example, when a difference between the target voltage and the previous voltage is large, if only the target voltage is applied from the start, it may not reach the target voltage while the switching element is turned on.

The dynamic capacitance compensation ("DCC") scheme has been proposed to improve the response speed of the liquid crystal using a driving method without changing the properties of the liquid crystal. Based on the fact that the charging rate becomes increases as the voltage at the liquid crystal capacitor increases, and in detail, the DCC typically reduces the time for the voltage charged in the liquid crystal capacitor to reach the target voltage by controlling the data voltage (in practice, it is a difference between the data voltage and the common voltage, and for convenience of description, the common voltage will be assumed to be 0 volt) applied to the corresponding pixel to be greater than the target voltage.

BRIEF SUMMARY OF THE INVENTION

The invention has been made in an effort to provide a liquid crystal display, a device modifying an image signal, and a method modifying an image signal for improving a response speed of liquid crystal molecules.

In an exemplary embodiment, a liquid crystal display includes: a pixel; a memory which stores compressed information in which a three-dimensional ("3-D") lookup table is coded; an image signal modifying unit which decodes the compressed information to generate a restored 3-D lookup table and generates a modified signal based on a first image signal of a first frame, a second image signal of a second frame, the third image signal of a third frame and the restored 3-D lookup table; and a data driver which converts the modified signal into the data voltage and supplies the data voltage to the pixel.

In an exemplary embodiment, an image signal modifying method of a liquid crystal display includes: receiving a first image signal, a second image signal and a third image signal during three continuous frames; decoding compressed information stored in a memory, in which a 3-D lookup table is coded, to generate a restored 3-D lookup table; generating a modified signal based on the first image signal, the second image signal, the third image signal and the restored 3-D lookup table; and converting the modified signal into a data voltage and supplying the data voltage to a pixel.

In an exemplary embodiment, an image signal modifying device for a liquid crystal display includes: a memory which stores compressed information in which a 3-D lookup table is coded; and an image signal modifying unit which decodes the compressed information to generate a restored 3-D lookup table and generates a modified signal based on a first image signal of a first frame, a second image signal of a second frame, a third image signal of a third frame and the restored 3-D lookup table, where the 3-D lookup table includes a plurality of 2-D lookup tables corresponding to a plurality of reference first image signals, and the plurality of 2-D lookup tables includes a plurality of reference modified signals corresponding to a plurality of reference second image signals and a plurality of reference third image signals.

According to an exemplary embodiment of the invention, a liquid crystal display with improved response speed of liquid crystal molecules, an image signal modifying device for a liquid crystal display, and an image signal modifying method may be provided.

BRIEF DESCRIPTION OF THE DRAWINGS

The above and other features of this disclosure will become more apparent by describing in further detail exemplary embodiments thereof with reference to the accompanying drawings, in which:

FIG. 3 shows an LUT 192, an LUT 208 and an LUT 224 as two dimensional ("2-D") LUTs adjacent to each other among a plurality of 2-D LUTs included in the 3-D LUT of FIG. 2;

FIG. 4 is an exemplary embodiment of a difference table (dT14=LUT 192 to LUT 208);

FIG. 5 is an exemplary embodiment of a difference table (dT15=LUT 208 to LUT 224;

DETAILED DESCRIPTION OF THE INVENTION

Figure 1:
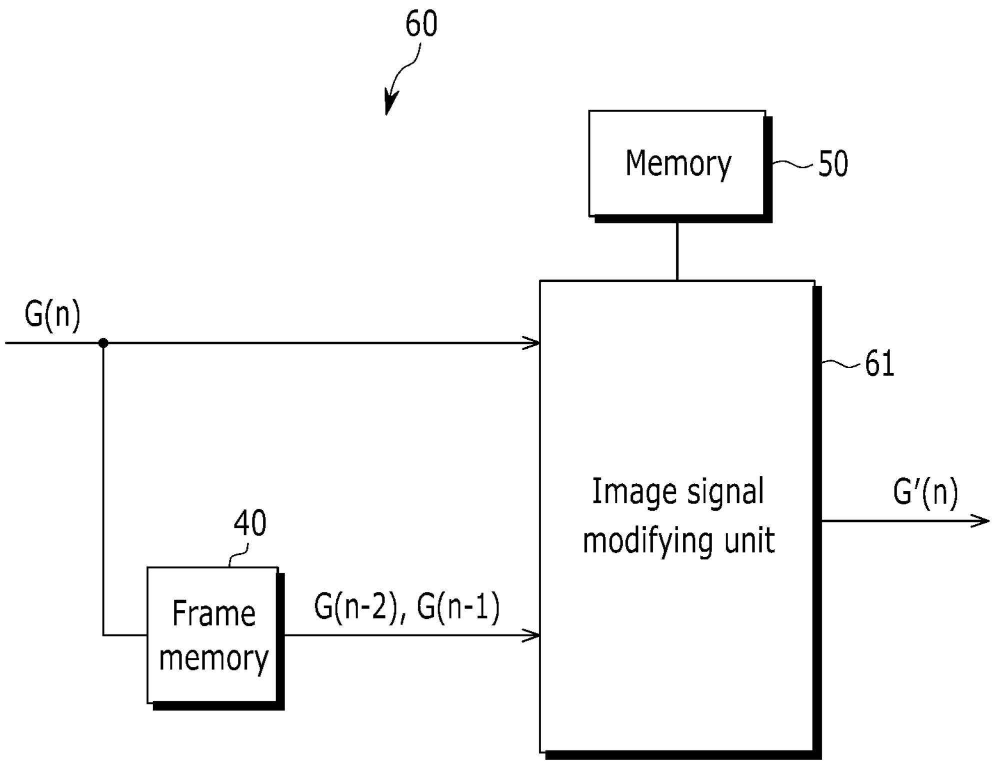
FIG. 1 is a block diagram showing an exemplary embodiment of a device for modifying an image signal for a liquid crystal display according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

Figure 2:
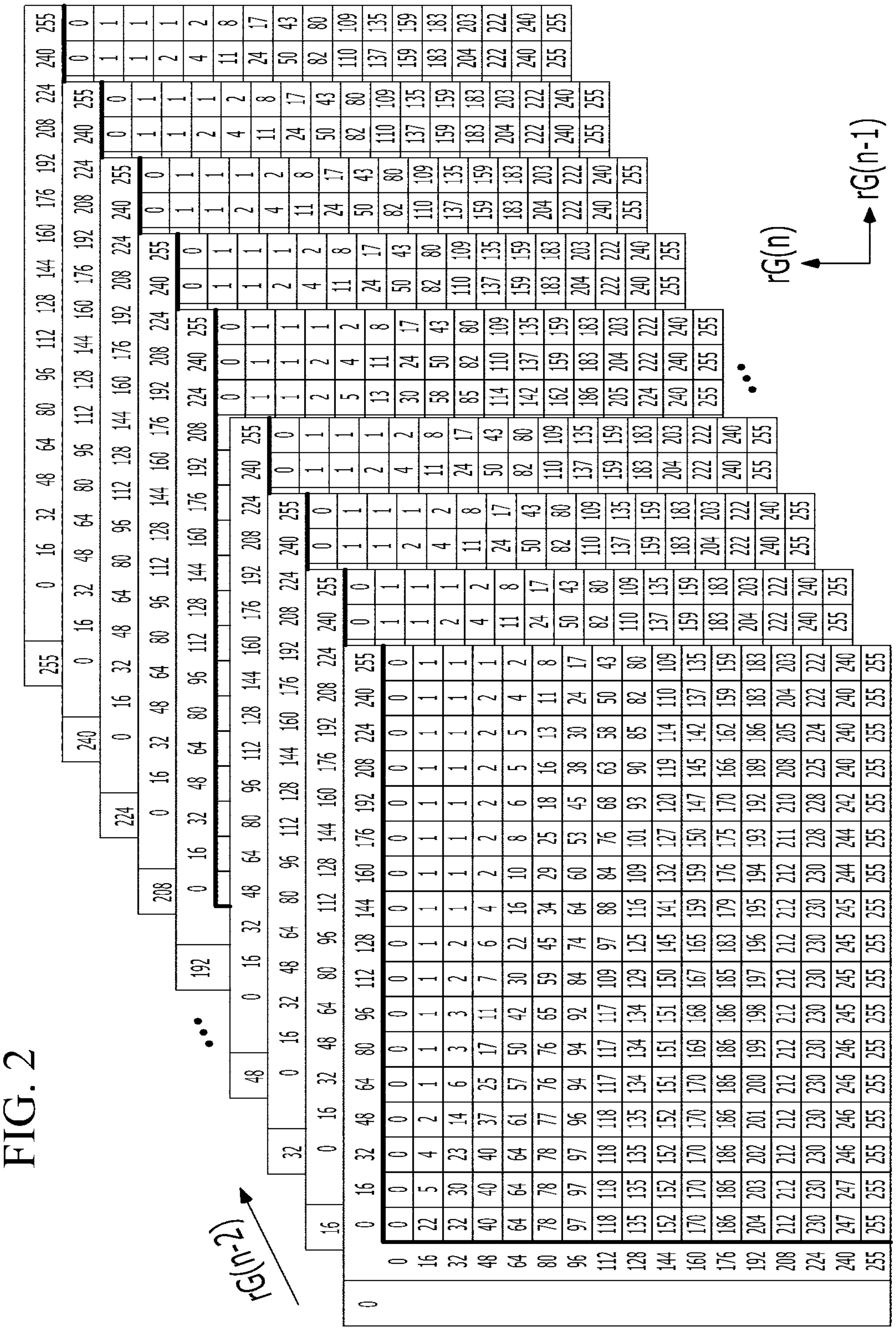
FIG. 2 is an exemplary embodiment of a three-dimensional ("3-D") lookup table ("LUT")

FIG. 1 is a block diagram of an exemplary embodiment of an image signal modifying device according to the invention, and FIG. 2 is an exemplary embodiment of a three-dimensional ("3-D") lookup table.

Referring to FIG. 1, an image signal modifying device 60 includes a frame memory 40, a image signal modifying unit 61 connected to the frame memory 40, and a memory 50 connected to the image signal modifying unit 61.

For convenience of description, an image signal G(n−2) of an (n−2)-th frame is defined as a previous-previous image signal, an image signal G(n−1) of an (n−1)-th frame is defined as a previous image signal, and an image signal G(n) of an n-th frame is defined as a current image signal. An image signal of a frame may include grays for all pixels. Hereinafter, the previous-previous image signal G(n−2) may be referred to as the first image signal, the previous image signal G(n−1) may be referred to as the second image signal and the current image signal G(n) may be referred to as the third image signal. The (n−2)-th frame may be referred to as the first frame, the (n−1)-th frame may be referred to as the second frame, and the n-th frame may be referred to as the third frame. In an exemplary embodiment, the first to third frames are three continuous frames, e.g., the second frame follows the first frame and the third frame follows the second frame.

The frame memory 40 outputs the first image signal G(n−2) and second image signal G(n−1), which are stored in the frame memory 40, to the image signal modifying unit 61, and receives and stores the third image signal G(n) from an external device.

The memory 50 stores compressed information, e.g., information compressed by coding, of a 3-D lookup table. The 3-D lookup table includes a modified signal G'(n) corresponding to a combination of the first image signal G(n−2), the second image signal G(n−1) and the third image signal G(n).

In such an embodiment, the size of the 3-D lookup table 50 may be substantially increased when the 3-D lookup table 50 stores all modified signals G'(n) corresponding to all combinations of the first image signal G(n−2), the second image signal G(n−1) and the third image signal G(n).

In an exemplary embodiment, the 3-D lookup table may include a reference modified signal rG'(n) corresponding to a combination of a reference first image signal rG(n−2), a reference second image signal rG(n−1) and a reference third image signal rG(n) (hereinafter referred to as "a combination of reference image signals").

In an exemplary embodiment, the 3-D lookup table includes a plurality of 2-D lookup tables corresponding to a plurality of reference first image signals rG(n−2), a plurality of 2-D lookup tables include a plurality of reference modified signals rG'(n) corresponding to a plurality of reference second image signals rG(n−1) and a plurality of reference third image signals rG(n).

In an exemplary embodiment, a dynamic capacitance compensation ("DCC") scheme is applied to the 3-D lookup table. In such an embodiment, the reference modified signal rG'(n) of the 3-D lookup table represents a value that is generated by applying the DCC scheme to the reference third image signal rG(n) based on the reference first image signal rG(n−2) and the reference second image signal rG(n−1). In an exemplary embodiment, the reference modified signal rG'(n) of the 3-D lookup table may be determined based on experimental results and is then stored.

The image signal modifying unit 61 decodes the compressed information of the 3-D lookup table stored in the memory 50 and generates a restored 3-D lookup table.

The image signal modifying unit 61 modifies the third image signal G(n) and outputs the modified signal G'(n) based on the first image signal G(n−2) received from the frame memory 40, the second image signal G(n−1) received from the frame memory 40, the third image signal G(n) received from an external device and the restored 3-D lookup table.

In an exemplary embodiment, a modified signal G'(n) corresponding to a combination of a non-reference first image signal G(n−2), a non-reference second image signal G(n−1) and a non-reference third image signal G(n), which are not included in the 3-D lookup table (hereinafter referred to as "a combination of non-reference image signals") may be obtained by interpolating data in the restored 3-D lookup table.

FIG. 2 shows an exemplary embodiment of the 3-D lookup table. In the 3-D lookup table of FIG. 2, each of the first to third image signals G(n−2), G(n−1), and G(n) has 8 bits, and the gray of each of the image signals G(n−2), G(n−1), and G(n) has a value in a range from 0 to 255.

Referring to FIG. 2, the 3-D lookup table includes a plurality of 2-D lookup tables corresponding to a plurality of reference first image signals rG(n−2), and a plurality of 2-D lookup tables respectively include a plurality of reference modified signals rG'(n) corresponding to a plurality of reference second image signals rG(n−1) and a plurality of reference third image signals rG(n). The 2-D lookup tables include the information of a plurality of reference modified signals rG'(n) in a matrix form such that the 2-D lookup tables may be seen as a matrix.

In the 3-D lookup table, the gray of each of the reference first image signal to the reference third image signal rG(n−2), rG(n−1) and rG(n) is in a range from a value of 0 to a value of 255, and a gray interval of each of the reference first image signal to the reference third image signal rG(n−2), rG(n−1), and rG(n) has a value of 16, except for the gray interval between the two greatest grays, e.g., the gray value of 224 and the gray of 255, of the reference first image signal to the reference third image signal rG(n−2), rG(n−1) and rG(n) that has a value of 15. In such an embodiment, the 3-D lookup table includes 17×17×17 reference modified signals rG'(n) for 17 reference first image signals rG(n−2), 17 reference second image signals rG(n−1), and 17 reference third image signals rG(n). The size of one reference modified signal rG'(n) is 8 bits such that the 3-D lookup table thereby include the reference modified signals rG'(n) of 17×17×17×8 bits.

In such an embodiment, the size of the memory 50 may be substantially large to store the reference modified signals rG'(n) of 17×17×17×8 bits of the 3-D lookup table therein. In an exemplary embodiment, the memory 50 stores the compressed information in which the 3-D lookup table is coded, thereby reducing the size of the memory 50.

Hereinafter, the compressed information in which the 3-D lookup table is coded will be described with reference to FIG. 3 to FIG. 5. For convenience of description, the 2-D lookup table in which the gray of the reference first image signal rG(n−2) among a plurality of 2-D lookup tables included in the 3-D lookup table is N is referred to as "LUT N". For example, "LUT 208" means a 2-D lookup table corresponding to the reference first image signal rG(n−2) having a gray value of 208.

In an exemplary embodiment, the 2-D lookup table may be in a matrix form such that the 2-D lookup tables may be calculated using matrix calculation. In such an embodiment, a difference table dT may be defined by a matrix subtraction of the 2-D lookup tables.

The following Table 1 shows 16 difference tables defined using 17 2-D lookup tables included in the 3-D lookup table of FIG. 2.

TABLE 1

| Difference table | Definition |
|---|---|
| dT2 | LUT 0-LUT 16 |
| dT3 | LUT 16-LUT 32 |
| dT4 | LUT 32-LUT 48 |
| dT5 | LUT 48-LUT 64 |
| dT6 | LUT 64-LUT 80 |
| dT7 | LUT 80-LUT 96 |
| dT8 | LUT 96-LUT 112 |
| dT9 | LUT 112-LUT 128 |
| dT10 | LUT 128-LUT 144 |
| dT11 | LUT 144-LUT 160 |
| dT12 | LUT 160-LUT 176 |
| dT13 | LUT 176-LUT 192 |
| dT14 | LUT 192-LUT 208 |
| dT15 | LUT 208-LUT 224 |
| dT16 | LUT 224-LUT 240 |
| dT17 | LUT 240-LUT 255 |

Referring to Table 1, the difference table dT14 is defined a matrix subtraction of LUT 208 from LUT 192, and the difference table dT15 is defined as a matrix subtraction of LUT 224 from LUT 208.

Figure 6:
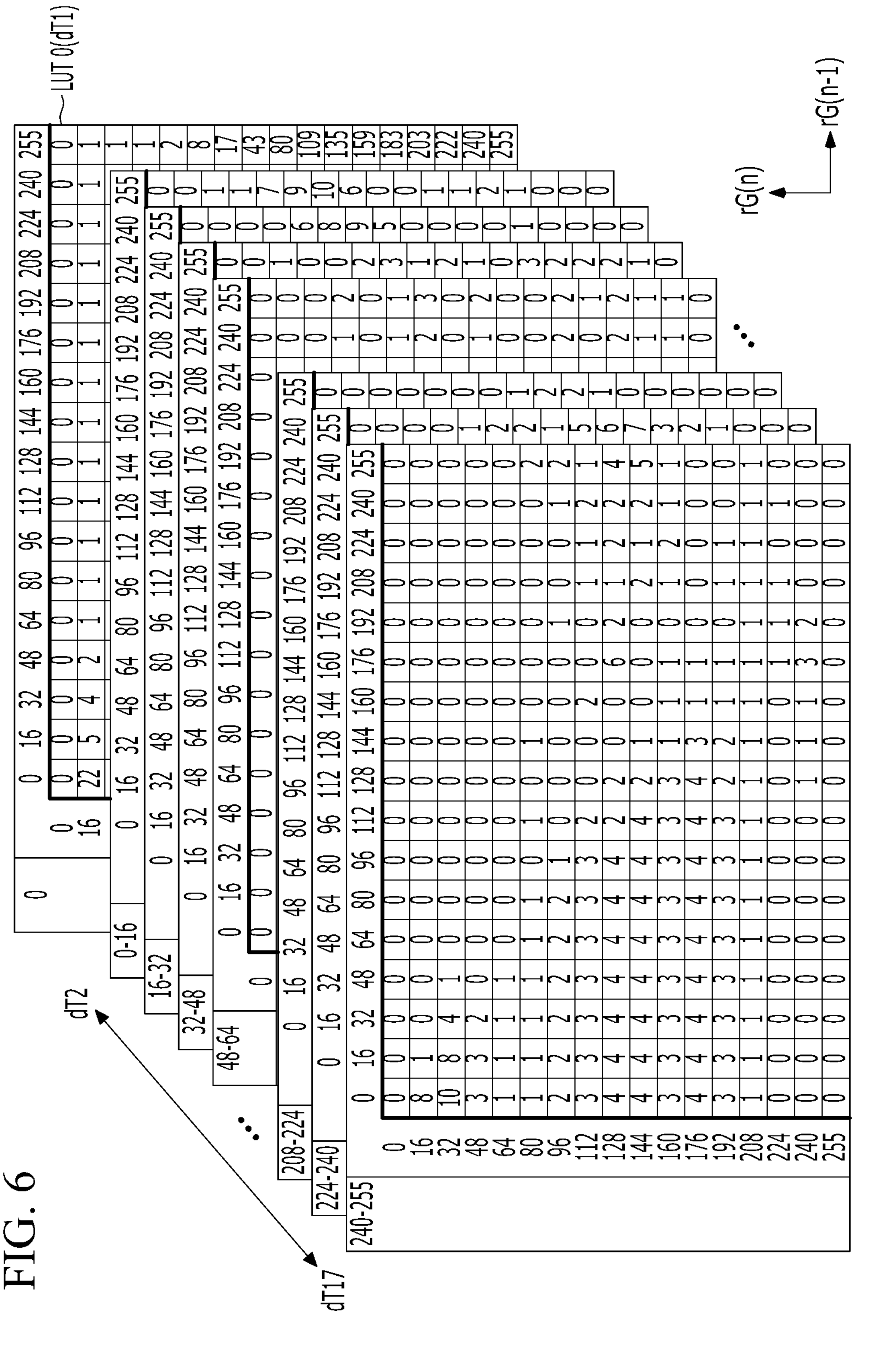
FIG. 6 is an exemplary embodiment of a difference 3-D LUT including a plurality of difference tables.

FIG. 3 shows a LUT 192, a LUT 208 and a LUT 224 as 2-D lookup tables adjacent to each other among a plurality of 2-D lookup tables included in a 3-D lookup table of FIG. 2, FIG. 4 shows a difference table (dT14=LUT 192−LUT 208), FIG. 5 shows a difference table (dT15=LUT 208−LUT 224), and FIG. 6 shows a difference 3-D lookup table including a plurality of difference tables.

Referring to FIGS. 3 to 6, elements of the difference table mainly have values in a range of 0 to 3, which is substantially small values, due to high correlation between the adjacent 2-D tables. In such an embodiment, a maximum value of the elements of the difference table shown in FIGS. 4 and 5 is 10. Accordingly, each of the elements of the difference table may be represented by 4 bits.

Referring to FIG. 6, a difference 3-D lookup table includes difference tables dT1-dT17 based on Table 1. The difference 3-D lookup table includes one basic 2-D lookup table LUT 0(dT1) and a plurality of difference tables dT2-dT17.

The 3-D lookup table in FIG. 2 includes information in 17×17×17×8 bits. However, in an exemplary embodiment of the difference 3-D lookup table of FIG. 6, the one basic 2-D lookup table LUT 0(dT1) includes information in 17×17×8 bits, and the plurality of difference tables dT2-dT17 include information in 17×17×16×4 bits. Accordingly, the difference 3-D lookup table includes the information in 17×17×8+17×17×16×4 bits. In such an embodiment, the size of the information of the difference 3-D lookup table may be reduced by about 50% compared with the size of the information in the 3-D lookup table shown in FIG. 2 such that the size of the memory may be substantially reduced.

In an exemplary embodiment, the compressed information of the 3-D lookup table stored in the memory may include the information of the one basic 2-D lookup table LUT 0(dT1) and the plurality of difference tables dT2-dT17.

In an exemplary embodiment, the compressed information stored in the memory may be the difference 3-D lookup table, and the information of the plurality of difference tables dT2-dT17 may be the plurality of difference tables dT2-dT17.

In an exemplary embodiment, the elements of a plurality of difference tables dT2-dT17 included in the difference 3-D lookup table may have continuously repeating values of 0 to 3 such that the plurality of difference tables dT2-dT17 may be compressed using an image compression method. In one exemplary embodiment, for example, the image compression method may be a run-length coding or Huffman coding, but not being limited thereto. Run-length coding is a method of coding a number of the same values that are continuous. In run-length coding, for example, (0 and 5) means that "0" is continuously repeated five times, and (1 and 3) means that "1" is continuously repeated three times. Huffman coding is a type of varying length coding methods, which allocates fewer bits for a value that is frequently generated and allocates more bits for a value that is rarely generated.

In such an embodiment, the information of the plurality of difference tables dT2-dT17 included in the compressed information of the 3-D lookup table stored in the memory may be information of the plurality of difference tables dT2-dT17 that are compressed through the run-length coding or the Huffman coding.

Figure 7:
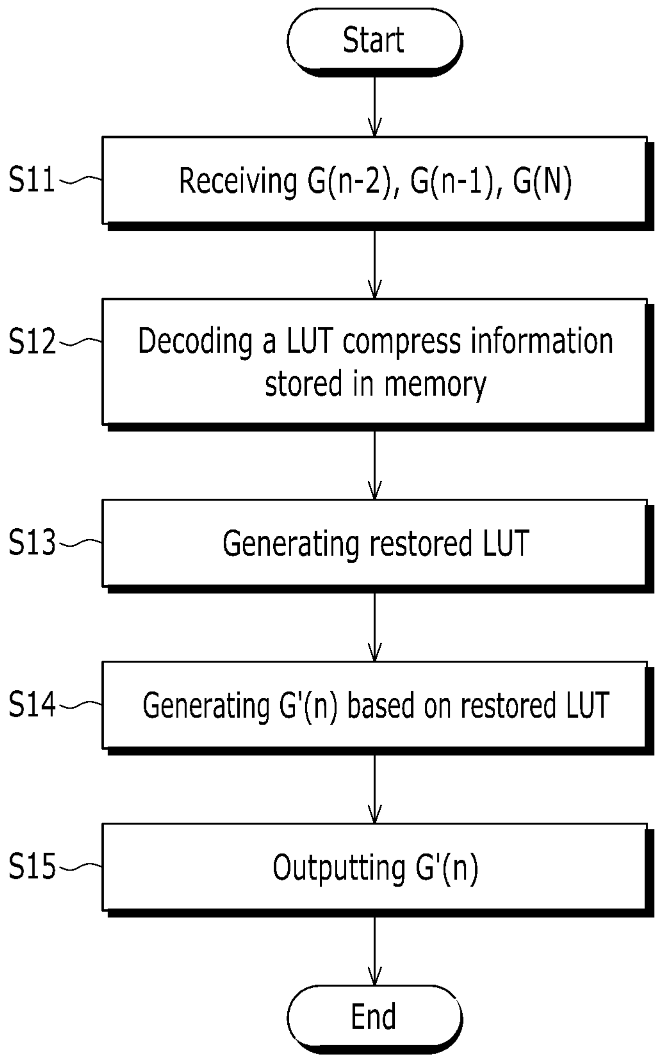
FIG. 7 is a flowchart showing an exemplary embodiment of a method for modifying an image signal for a liquid crystal display according to the invention.

FIG. 7 is a flowchart showing an exemplary embodiment of an image signal modifying method for a liquid crystal display according to the invention. The image signal modifying method for the liquid crystal display may be executed in the image signal modifying device 60 of FIG. 1.

Referring to FIG. 7, the image signal modifying device receives the first image signal G(n−2), the second image signal G(n−1) and the third image signal G(n) (S11). The image signal modifying device decodes the compressed information stored in the memory, in which the 3-D lookup table is coded, (S12) to generate the restored 3-D lookup table (S13).

In an exemplary embodiment, the restored 3-D lookup table data may be the 3-D lookup table. In an alternative exemplary embodiment, the restored 3-D lookup table data may be decoded information generated by decoding predetermined 2-D lookup tables. When the predetermined 2-D lookup tables are decoded, the decoding operation is substantially simplified and complexity of the image signal modifying device is substantially decreased.

In an exemplary embodiment, the image signal modifying device modifies the third image signal G(n) based on the first image signal G(n−2), the second image signal G(n−1), the third image signal G(n) and the restored 3-D lookup table, and generates the modified signal G'(n) (S12). The image signal modifying device outputs the generated modified signal G'(n) (S13).

In an exemplary embodiment, the restored 3-D lookup table may be calculated by the interpolation to obtain the modified signal G'(n) corresponding to the combination of the non-reference image signal as the combination of the first image signal G(n−2), the second image signal G(n−1) and the third image signal G(n) that are not stored in the 3-D lookup table.

In an exemplary embodiment, the reference modified signal rG'(n) corresponding to the combination of the reference image signals rG(n−2), rG(n−1) and rG(n) close to the combination of the corresponding non-reference image signals G(n−2), G(n−1) and G(n) is determined from the 3-D lookup table LUT such that the modified signal G'(n) for the combination of the non-reference image signals (n−2), G(n−1) and G(n) is obtained. In an exemplary embodiment, the modified signal G'(n) corresponding to the combination of the corresponding non-reference image signals G(n−2), G(n−1) and G(n) is calculated through interpolation based on the reference modified signal rG'(n).

In one exemplary embodiment, for example, an image signal, which is a digital signal, is divided into a high-order bit and a low-order bit, and the reference modified signals rG'(n) corresponding to the combination of the reference image signals rG(n−2), rG(n−1) and rG(n) with the low-order bit of 0 are stored in the 3-D lookup table. Reference modified signals rG'(n) corresponding to the combination of image signals G(n−2), G(n−1) and G(n) are generated based on the high-order bit from the 3D lookup table LUT, and a modified signal G'(n) is calculated by using the low-order bit of the combination of the image signals G(n−2), G(n−1) and G(n) and the reference modified signals rG'(n) generated from the 3D lookup table LUT.

According to an exemplary embodiment of the invention, the memory stores the compressed information in which the 3-D lookup table is coded such that the image signal modifying device including a memory with reduced size may be provided for the liquid crystal display information. The compressed information in which the 3-D lookup table is coded may include one basic 2-D lookup table and information of a plurality of difference tables. The information of the plurality of difference tables may be information regarding a plurality of difference tables that is compressed by the run-length coding or the Huffman coding.

An exemplary embodiment of the liquid crystal display may include the image signal modifying device 60 shown in FIG. 1.

Figure 8:
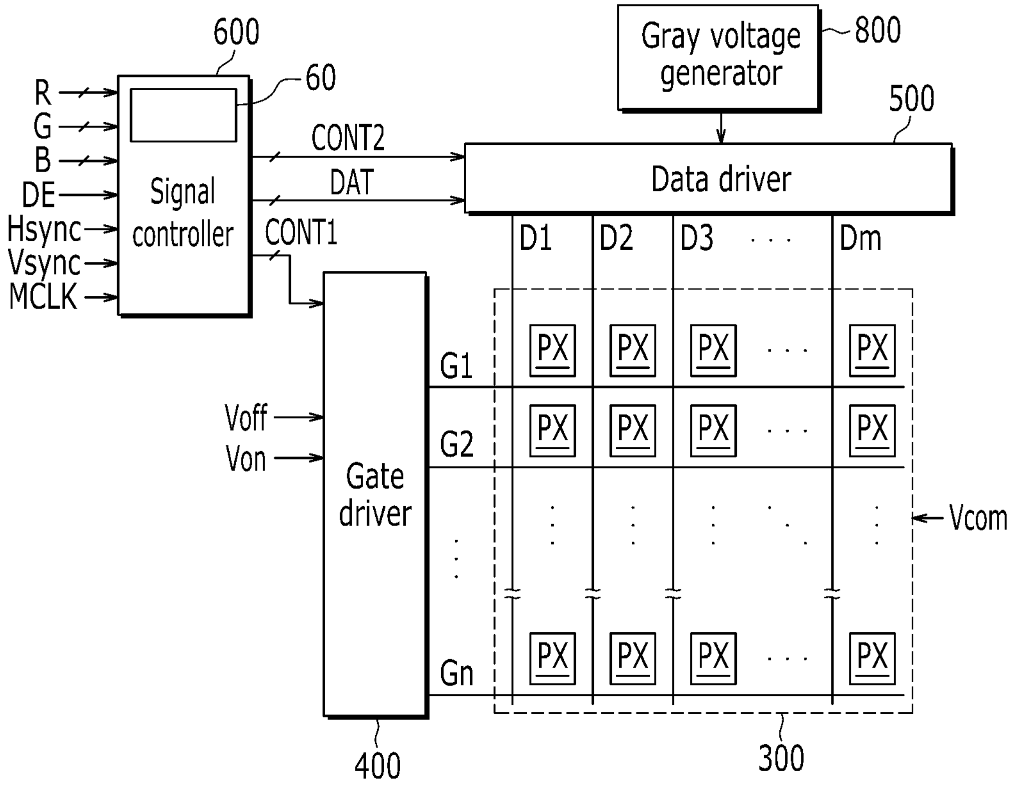
FIG. 8 is a block diagram showing an exemplary embodiment of a liquid crystal display according to the invention.
Figure 9:
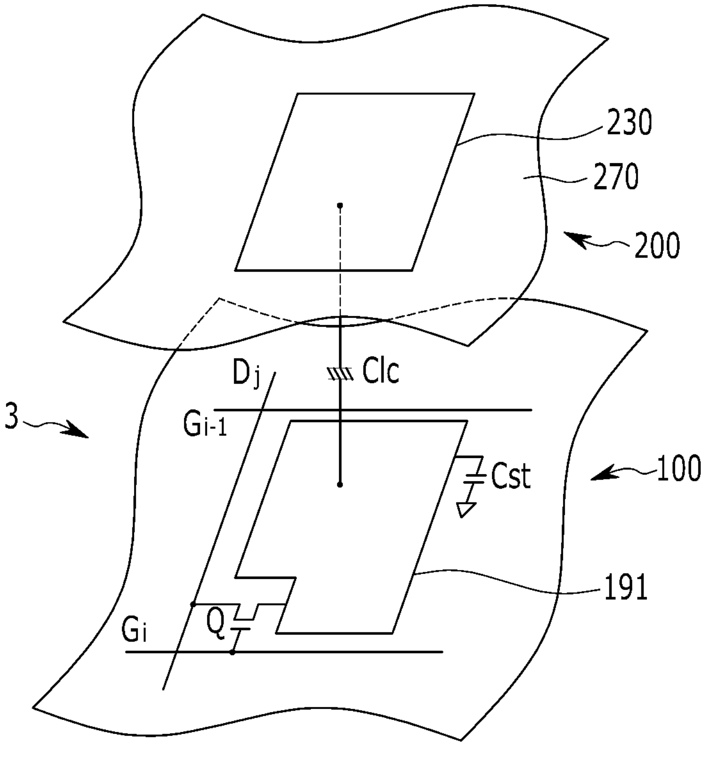
FIG. 9 is an equivalent circuit diagram showing a single pixel of an exemplary embodiment of a liquid crystal display according to the t invention.

FIG. 8 is a block diagram showing an exemplary embodiment of a liquid crystal display according to the invention, and FIG. 9 is an equivalent circuit diagram showing a single pixel of an exemplary embodiment of a liquid crystal display according to the invention.

As shown in FIG. 8, an exemplary embodiment of the liquid crystal display according to the invention includes a liquid crystal panel assembly 300, a gate driver 400 connected to the liquid crystal panel assembly 300, a data driver 500 connected to the liquid crystal panel assembly 300, a gray voltage generator 800 connected to the data driver 500, and a signal controller 600 which controls the gate driver 400 and the data driver 500.

The liquid crystal panel assembly 300 includes a plurality of signal lines G1 to Gn and D1 to Dm and a plurality of pixels PX connected thereto and arranged substantially in matrix a matrix form when viewed from a schematic circuit diagram thereof. In an exemplary embodiment, as shown in FIG. 9, the liquid crystal panel assembly 300 includes lower and upper panels 100 and 200 opposite to each other and a liquid crystal layer 3 interposed therebetween.

The signal lines G1 to Gn and D1 to Dm include a plurality of gate lines G1 to Gn that transfers a gate signal (also referred to as a "scan signal") and a plurality of data lines D1 to Dm that transfers a data voltage. The gate lines G1 to Gn extend substantially in a row direction and are substantially parallel to each other, and the data lines D1 to Dm extend substantially in a column direction and are substantially parallel to each other.

Each of the pixels PX, e.g., a pixel PX connected to an i-th gate line Gi (i=1, 2, . . . , n) and a j-th data line Dj (j=1, 2, . . . , m), includes a switching element Q connected to the signal lines Gi and Dj, and a liquid crystal capacitor Clc and a storage capacitor Cst connected thereto. In an alternative exemplary embodiment, the storage capacitor Cst may be omitted.

The switching element Q, which may be a 3-terminal element such as a thin film transistor, is provided on the lower panel 100. A control terminal of the switching element Q is connected to the gate line Gi, an input terminal is connected to the data line Dj, and an output terminal is connected to the liquid crystal capacitor Clc and the storage capacitor Cst. The thin film transistor may include polycrystalline silicon or amorphous silicon.

The liquid crystal capacitor Clc includes a pixel electrode 191 of the lower panel 100 and a common electrode 270 of the upper panel 200 as two terminals thereof, and the liquid crystal layer 3 between the two electrodes 191 and 270 serves as a dielectric material. The pixel electrode 191 is connected with the switching element Q, and the common electrode 270 is disposed on the front surface of the upper panel 200 and receives the common voltage Vcom. In an alternative exemplary embodiment, the common electrode 270 may be provided on the lower panel 100. In such an embodiment, at least one of the two electrodes 191 and 270 may have a linear shape or a bar shape.

In an exemplary embodiment, the storage capacitor Cst that supports the liquid crystal capacitor Clc may include an additional signal line (not shown) and the pixel electrode 191 that are provided on the lower panel 100 and overlapping each other as two terminals thereof with an insulator interposed therebetween, and a predetermined voltage such as the common voltage Vcom, for example, is applied to the additional signal line. In an alternative exemplary embodiment, the storage capacitor Cst may include the pixel electrode 191 and a neighboring gate line of a neighboring pixel, overlapping each other with the insulator interposed therebetween.

In an exemplary embodiment, each pixel PX uniquely displays one of primary colors (spatial division) or each pixel PX alternately displays the primary colors according to time (temporal division) to recognize a desired color through a spatial or temporal sum of the primary colors and to thereby implement a color display. In an exemplary embodiment, the primary colors may include three primary colors of red, green and blue. In FIG. 9, each pixel PX includes a color filter 230 to display one of the primary colors in the region of the upper panel 200 corresponding to the pixel electrode 191 based on the spatial division. In such an embodiment, three pixels PX that display red, green and blue respectively form one dot that displays one color. In an alternative exemplary embodiment, the color filter 230 may be placed over or below the pixel electrode 191 of the lower panel 100.

At least one polarizer (not shown) for polarizing light is attached to an outer surface of the liquid crystal panel assembly 300.

Referring back to FIG. 8, the gray voltage generator 800 generates two gray voltage sets associated with transmittance of the pixel PX. One of the two gray voltage sets has a positive value with respect to the common voltage Vcom, and the other of the two gray voltage sets has a negative value with respect to the common voltage Vcom. The number of gray voltages included in a gray voltage set generated by the gray voltage generator 800 may be substantially the same as the number of grays to be displayed by the liquid crystal display.

The data driver 500 is connected with the data lines D1 to Dm of the liquid crystal panel assembly 300, selects a gray voltage from the gray voltage set from the gray voltage generator 800, and applies the selected gray voltage to the data lines D1 to Dm as the data voltage.

The gate driver 400 applies the gate signal including a gate-on voltage Von and a gate-off voltage Voff to the gate lines G1 to Gn.

The signal controller 600 controls the gate driver 400, the data driver 500, etc., and includes the image signal modifying device 60 for processing the input image signals R, G and B to generate the modified signals. The modified signal may be the output image signal DAT. The image signal modifying device 60 and the image signal modifying method are described with reference to FIG. 1 to FIG. 7 in detail.

In an exemplary embodiment, as shown in FIG. 8, the image signal modifying device 60 may be disposed inside the signal controller 600. In an alternative exemplary embodiment, only a portion of the image signal modifying device 60 may be included in the signal controller 600. In another alternative exemplary embodiment, the image signal modifying device 60 may be separated from and disposed outside the signal controller 600.

In an exemplary embodiment, each of the drivers, e.g., the gate driver 400, the data driver 500, the signal controller 600 and the gray voltage generator 800, may be integrated onto the liquid crystal panel assembly 300 together with the signal lines G1 to Gn and D1 to Dm and the switching element Q. In an alternative exemplary embodiment, the drivers 400, 500, 600 and 800 may be mounted directly on the liquid crystal panel assembly 300 in the form of at least one integrated circuit chip, mounted on a flexible printed circuit film (not shown) to be attached to the liquid crystal panel assembly 300 in the form of a tape carrier package ("TCP"), or mounted on an additional printed circuit board (not shown). In an exemplary embodiment, the drivers 400, 500, 600 and 800 may be integrated as a single chip, and at least one of the drivers 400, 500, 600 and 800 or at least one circuit element configuring the drivers 400, 500, 600 and 800 may be disposed outside the single chip.

Hereinafter, operation of the liquid crystal display will be described in detail.

The signal controller 600 receives input image signals R, G and B and input control signals for controlling the display thereof from an external graphics controller (not shown). The input image signals R, G and B include luminance information of each pixel PX, and the luminance has a predetermined number, e.g., $1024=2^{10}$, $256=2^{8}$, or $64=2^{6}$ grays. The input control signals may include a vertically synchronization signal Vsync, a horizontal synchronization signal Hsync, a main clock signal MCLK and a data enable signal DE, for example.

The signal controller 600 generates and appropriately processes an output image signal DAT based on the input image signals R, G and B and the input control signals, and generates a gate control signal CONT1, a data control signal CONT2, and a backlight control signal (not shown). The signal controller 600 transmits the gate control signal CONT1 to the gate driver 400, and transmits the data control signal CONT2 and the processed output image signal DAT to the data driver 500.

The gate control signal CONT1 includes a scan start signal that commands a start of scanning and at least one clock signal that controls an output cycle of the gate-on voltage Von. The gate control signal CONT1 may also further include an output enable signal that limits continuous time of the gate-on voltage Von.

The data control signal CONT2 includes a horizontal synchronization start signal that indicates a start of transmission of the output image signal DAT for one group of pixels PX, a load signal that commands an application of the data voltage to the liquid crystal panel assembly 300, and a data clock signal. The data control signal CONT2 may also further include an inversion signal that inverts a voltage polarity (hereinafter referred to as a "polarity of the data signal" by abbreviating the "voltage polarity of the data signal to the common voltage") of the data voltage with respect to the common voltage Vcom.

In response to the data control signal CONT2 from the signal controller 600, the data driver 500 receives a digital output image signal for one group of pixels PX, selects the gray voltage corresponding to each digital output image signal, and converts the digital output image signal into an analog data voltage and applies the analog data voltage to the corresponding data lines D1 to Dm.

The gate driver 400 applies the gate-on voltage Von to the gate lines G1 to Gn to turn on the switching element Q connected to the gate lines G1 to Gn based on the gate control signal CONT1 from the signal controller 600. Then, the data voltage applied to the data lines D1 to Dm is applied to the corresponding pixel PX through the switching element Q that is turned on.

A difference between the data voltage applied to the pixel PX and the common voltage Vcom is represented as the charge voltage of the liquid crystal capacitor Clc, i.e., a pixel voltage. Orientations of liquid crystal molecules vary depending on the magnitude of the pixel voltage, and as a result, polarization of light passing through the liquid crystal layer varies. The variation of the polarization is displayed as a variation of transmittance of light by the polarizer attached to the panel assembly 300, and as a result, the pixel PX displays luminance displayed by the gray of the image signal DAT.

By repeatedly performing the process in each unit horizontal period (also referred to as "1H" and that is the same as one period of the horizontal synchronization signal Hsync and the data enable signal DE), the gate-on voltage Von is sequentially applied to all the gate lines G1 to Gn and the data voltage is applied to all the pixels PX to display an image of one frame.

In an exemplary embodiment, when one frame ends, a subsequent frame starts and a state of the inversion signal applied to the data driver 500 is controlled such that the polarity of the data voltage applied to each pixel PX is opposite to the polarity of the data voltage applied thereto in the previous frame ("frame inversion"). In such an embodiment, the polarity of the data voltage that flows through one data line is changed according to a characteristic of the inversion signal (e.g., row inversion and dot inversion) within one frame, or the polarities of the data voltages applied to one pixel row may be changed frame by frame (e.g., column inversion and dot inversion).

When a voltage is applied to the liquid crystal capacitor Clc, liquid crystal molecules of the liquid crystal layer 3 are rearranged to be in a stable state that corresponds to the voltage, and the voltage may be applied for a predetermined time until the liquid crystal molecules reach the stable state due to the response speed of the liquid crystal molecules. When the voltage applied to the liquid crystal capacitor Clc is maintained, the liquid crystal molecules move until they reach the stable state, during which the light transmittance is also changed. The light transmittance becomes constant when the liquid crystal molecules have reached the stable state in which the liquid crystal molecules do not move.

A pixel voltage in the stable state is also referred to as a target pixel voltage, light transmittance also referred to as target light transmittance, and the target pixel voltage and the target light transmittance are in a 1-to-1 correspondence relationship.

However, the time for turning on the switching element Q of each pixel PX to apply the data voltage is limited such that the liquid crystal molecules may not reach the stable state during the application of the data voltage. A voltage difference at the liquid crystal capacitor Clc still exists when the switching element Q is turned off such that the liquid crystal molecules may be still moving to reach the stable state. Accordingly, when the arrangement state of the liquid crystal molecules is changed, the permittivity of the liquid crystal layer 3 is changed and capacitance of the liquid crystal capacitor Clc is changed. When the switching element Q is turned off, one terminal of the liquid crystal capacitor Clc is floating, and the total charges stored in the liquid crystal capacitor Clc are not changed without considering the leakage current. Therefore, the change of capacitance of the liquid crystal capacitor Clc result in a change of the voltage at the liquid crystal capacitor Clc, that is, the pixel voltage.

Therefore, when the data voltage (referred to as a "target data voltage hereinafter") corresponding to the target pixel voltage to be in the stable state is applied to the pixel PX, the actual pixel voltage of the pixel PX may be different from the target pixel voltage such that the target transmittance may not be obtained. Particularly, when the difference between the target transmittance and the transmittance of the pixel PX becomes greater, the difference between the actual pixel voltage and the target pixel voltage becomes greater.

Therefore, the data voltage applied to the pixel PX may be set to be greater or less than the target data voltage, which may be realized by the DCC scheme.

In an exemplary embodiment of the invention, the DCC scheme is performed by the image signal modifying device 60 included in the signal controller 600 or an additional image signal modifying device. The image signal modifying device modifies the third image signal G(n), which is an image signal of a current frame, for a pixel PX based on the second image signal G(n−1) that is the image signal of a previous frame for the corresponding pixel PX and the first image signal G(n−2) that is the image signal of the previous-previous frame to generate a modified signal G'(n), which is a modified third image signal. In such an embodiment, the image signal modifying device restores the compressed information, in which the 3-D lookup table is coded, stored in the memory to generate the restored 3-D lookup table and the modified signal G'(n) based on the restoring 3-D lookup table.

The data driver 500 converts the modified signal G'(n) into a data voltage and applies the data voltage to the pixel PX. In an exemplary embodiment, the data voltage applied to each pixel PX becomes greater or lesser than the target data voltage by the DCC scheme.

As described above, according to an exemplary embodiment of the invention, three continuous frames are used when processing the DCC. Hereinafter, for convenience of description, the DCC using three continuous frames is referred to as a "DCC 3" and the DCC using two continuous frames is referred to as a "DCC 2".

Figure 10:
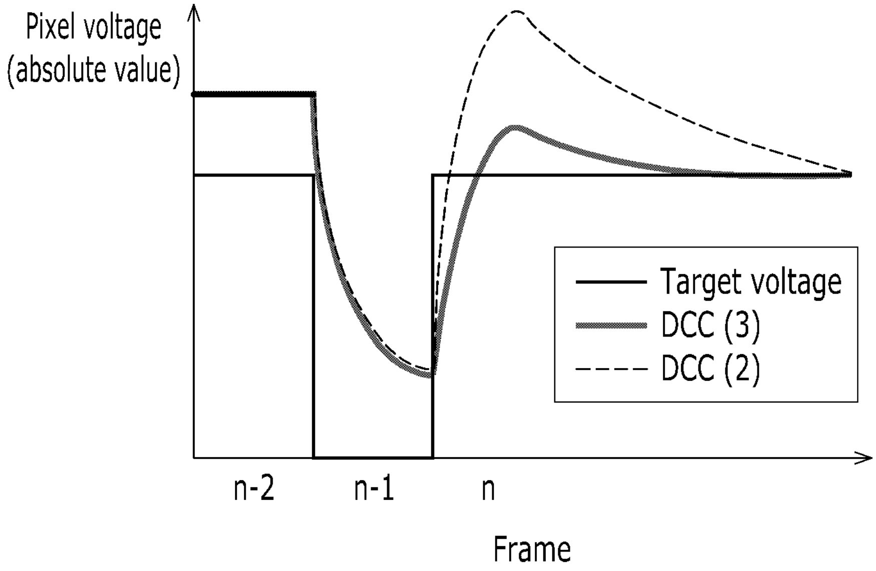
FIG. 10 and FIG. 11 are graphs showing pixel voltage versus frame when dynamic capacitance compensation ("DCC") 3 is used and when a DCC 2 is used in an exemplary embodiment of a liquid crystal display.
Figure 11:
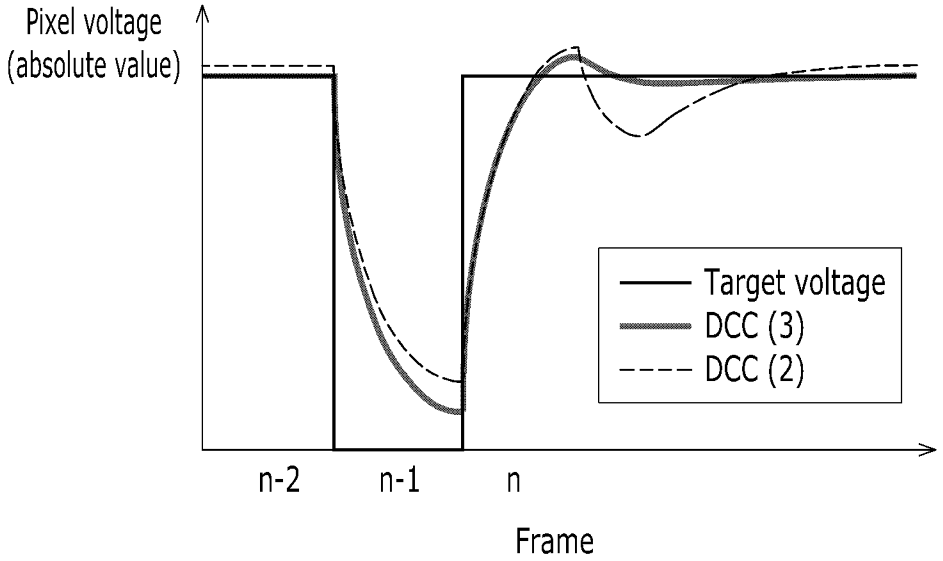

FIG. 10 and FIG. 11 are graphs showing pixel voltage versus frame when a DCC 3 is used and when DCC 2 is used in an exemplary embodiment of a liquid crystal display. In FIG. 10 and FIG. 11, the x axis represents a frame number and the y axis represents a pixel voltage displayed as an absolute value.

As shown in FIG. 10, an overshoot is low for the pixel voltage of an exemplary embodiment using the DCC 3 in frame n compared with the pixel voltage of an exemplary embodiment using the DCC 2. As shown in FIG. 11, a rising bounce is low for the pixel voltage of that the exemplary embodiment using the DCC 3 in the frame n compared with the pixel voltage of that the exemplary embodiment using the DCC 2. That is, the overshoot and the rising bounce may be improved for the DCC 3 compared with the DCC 2, and the display deterioration may be effectively prevented with improved liquid crystal response speed for the DCC 3 compared with the DCC 2.

As described above, according to an exemplary embodiment of the invention, the DCC is executed using the image signal of three continuous frames such that the display deterioration may be effectively prevented with improved liquid crystal response speed.

In an exemplary embodiment, the compressed information, in which the 3-D lookup table is coded, is stored in the memory such that a liquid crystal display including the memory with reduced size, the image signal modifying device for the liquid crystal display, and the image signal modifying method may be provided.

The compressed information, in which the 3-D lookup table is coded, may include one basic 2-D lookup table and information of a plurality of difference tables. The information of the plurality of difference tables may include compressed information of a plurality of difference tables through the run-length coding or the Huffman coding.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:

a pixel;

a memory which stores compressed information in which a three-dimensional (3-D) lookup table is coded;

an image signal modifying unit which decodes the compressed information to generate a restored 3-D lookup table defined by a plurality of two-dimensional (2-D) lookup tables, and generates a modified signal based on a first image signal of a first frame, a second image signal of a second frame, a third image signal of a third frame and the restored 3-D lookup table; and a data driver which converts the modified signal into a data voltage and supplies the data voltage to the pixel.

2. The liquid crystal display of claim 1, wherein the 3-D lookup table includes the plurality of two-dimensional (2-D) lookup tables corresponding to a plurality of reference first image signals, and the plurality of 2-D lookup tables includes a plurality of reference modified signals corresponding to a plurality of reference second image signals and a plurality of reference third image signals.

3. The liquid crystal display of claim 2, wherein the compressed information includes information of a difference table, and the difference table is defined by matrix subtraction between two adjacent 2-D lookup tables of the plurality of 2-D lookup tables.

4. The liquid crystal display of claim 3, wherein the information of the difference table is information in which the difference table is compressed.

5. The liquid crystal display of claim 4, wherein the difference table is compressed through run-length coding or Huffman coding.

6. The liquid crystal display of claim 2, wherein the plurality of 2-D lookup tables includes a first 2-D lookup table, a second 2-D lookup table and a third 2-D lookup table, and the compressed information includes information of a first difference table defined by matrix subtraction between the first 2-D lookup table and the second 2-D lookup table, and information of a second difference table defined by matrix subtraction between the second 2-D lookup table and the third 2-D lookup table.

7. The liquid crystal display of claim 6, wherein the information of the first difference table includes information in which the first difference table is compressed, and the information of the second difference table includes information in which the second difference table is compressed.

8. The liquid crystal display of claim 7, wherein the first difference table and the second difference table are compressed through run-length coding or Huffman coding.

9. The liquid crystal display of claim 8, wherein each of the first 2-D lookup table, the second 2-D lookup table and the third 2-D lookup table includes 2-D lookup tables corresponding to three continuous reference first image signals of the plurality of reference first image signals.

10. The liquid crystal display of claim 2, wherein the image signal modifying unit interpolates the restored 3-D lookup table to generate the modified signal when the first image signal is not one of the plurality of reference first image signals, when the second image signal is not one of the plurality of reference second image signals, or when the third image signal is not one of the plurality of reference third image signals.

11. The liquid crystal display of claim 10, further comprising a frame memory which stores or outputs the first image signal, the second image signal and the third image signal.

12. The liquid crystal display of claim 11, wherein the first frame, the second frame and the third frame are continuous frames, the second frame follows the first frame, and the third frame follows the second frame.

13. The liquid crystal display of claim 12, wherein the 3-D lookup table is set based on dynamic capacitance compensation.

14. An image signal modifying method of a liquid crystal display, comprising:

receiving a first image signal, a second image signal and a third image signal during three continuous frames;

decoding compressed information stored in a memory, in which a three-dimensional (3-D) lookup table is coded, to generate a restored 3-D lookup table defined by a plurality of two-dimensional (2-D) lookup tables;

generating a modified signal based on the first image signal, the second image signal, the third image signal and the restored 3-D lookup table; and converting the modified signal into a data voltage and supplying the data voltage to a pixel.

15. The image signal modifying method of claim 14, wherein the 3-D lookup table includes the plurality of two-dimensional (2-D) lookup tables corresponding to a plurality of reference first image signals, the plurality of 2-D lookup tables includes a plurality of reference modified signals corresponding to a plurality of reference second image signals and a plurality of reference third image signals, and the compressed information includes information of a difference table defined by matrix subtraction between two adjacent 2-D lookup tables of the plurality of 2-D lookup tables.

16. The image signal modifying method of claim 15, wherein the information of the difference table is information in which the difference table is compressed by run-length coding or Huffman coding.

17. The image signal modifying method of claim 16, wherein the generating the modified signal comprises:

interpolating the restored 3-D lookup table to generate the modified signal when the first image signal is not one of the plurality of reference first image signals, when the second image signal is not one of the plurality of reference second image signals, or when the third image signal is not one of the plurality of reference third image signals.

18. An image signal modifying device for a liquid crystal display, comprising:

a memory which stores compressed information in which a three-dimensional (3-D) lookup table is coded; and an image signal modifying unit which decodes the compressed information to generate a restored 3-D lookup table, and generates a modified signal based on a first image signal of a first frame, a second image signal of a second frame, a third image signal of a third frame and the restored 3-D lookup table, wherein the 3-D lookup table is defined by a plurality of two-dimensional (2-D) lookup tables corresponding to a plurality of reference first image signals, and wherein a plurality of 2-D lookup tables include a plurality of reference modified signals corresponding to a plurality of reference second image signals and a plurality of reference third image signals.

19. The image signal modifying device of claim 18, wherein the compressed information includes information of a difference table defined by matrix subtraction between two adjacent 2-D lookup tables of the plurality of 2-D lookup tables.

20. The image signal modifying device of claim 19, wherein the information of the difference table is information in which the difference table is compressed through run-length coding or Huffman coding.

* * * * *